United States Patent
Robbins

(10) Patent No.: US 8,683,914 B1
(45) Date of Patent: Apr. 1, 2014

(54) BASTER AND METHOD

(75) Inventor: Rodney W. Robbins, Florence, AL (US)

(73) Assignee: Fox Run USA, LLC, Ivyland, PA (US)

(*) Notice: Subject to any disclaimer, the term of this patent is extended or adjusted under 35 U.S.C. 154(b) by 93 days.

(21) Appl. No.: 13/065,010

(22) Filed: Mar. 11, 2011

(51) Int. Cl.
*A47J 37/10* (2006.01)

(52) U.S. Cl.
USPC ............... 99/345; 99/346; 99/534; 141/26; 141/357; 222/215

(58) Field of Classification Search
USPC ........... 99/345, 346, 516, 494, 532, 534, 535; 141/26, 25, 357, 21; 222/215, 213, 209
See application file for complete search history.

(56) References Cited

U.S. PATENT DOCUMENTS

| | | | |
|---|---|---|---|
| D195,238 S | 5/1963 | Mitchell | |
| 3,215,171 A * | 11/1965 | Mitchell | 141/24 |
| 3,844,284 A * | 10/1974 | Schoenfeld et al. | 604/216 |
| D237,655 S | 11/1975 | Engelsher | |
| 4,129,066 A | 12/1978 | Corley | |
| 4,295,582 A * | 10/1981 | Acres | 222/213 |
| 5,638,872 A * | 6/1997 | Porter | 141/26 |
| 5,787,799 A * | 8/1998 | Mohrhauser et al. | 99/345 |
| 6,840,164 B2 * | 1/2005 | Eastman | 99/532 |
| 7,306,128 B2 * | 12/2007 | Eimer | 222/494 |
| 7,681,494 B2 * | 3/2010 | Backus et al. | 99/345 |
| 2008/0202631 A1 * | 8/2008 | Loewenthal et al. | 141/26 |

* cited by examiner

*Primary Examiner* — Reginald L Alexander
(74) *Attorney, Agent, or Firm* — Gregor N. Neff

(57) ABSTRACT

The baster has a bellows for use in providing suction to draw basting liquid into a tapered tube, and compression to eject the liquid out of the tube. A valve at the lower tip of the tube provides resistance to the unwanted outflow of liquid from the tube to greatly reduce or eliminate dripping. Preferably, the valve has the form of a flexible membrane over the lower tip of the tube, with a plurality of slits which cross one another.

2 Claims, 4 Drawing Sheets

BASTER AND METHOD

This invention relates to food basters, and particularly to basters for basting turkeys or other large fowl.

Food basters presently available usually include an elongated tube with an enlarged resilient hollow globe or bulb at one end, and sometimes a valve inside the hollow tube. The baster is used by hand. The bulb is compressed to expel air or liquid out of the tube, and is released to draw liquid into the tube.

There are several problems with such prior baster devices. One is that the baster often drips when the tube is filled with basting liquid and the baster is moved from one place to another. Presently available basters, even those with valves, sometimes do not sufficiently protect against dripping of the basting fluid from the tube so that excess leakage occurs.

A second problem, one realized by the applicant, is that suction provided by the compression and release of the rubber bulb is limited due to the structure of the bulb and the capabilities of the human hand in manipulating the bulb.

Accordingly, it is an object to provide a basting device and method which either solve or ameliorate the foregoing problems.

In particular, it is an object of the invention to provide a baster with increased useful suction and ejection capacity to increase the basting liquid volume handling capabilities of the baster.

It is a further object to provide such a device which is relatively less prone to unwanted dripping of basting liquid from the device.

It is a further object to provide such a basting device which is relatively inexpensive to manufacture, is relatively easy to disassemble for cleaning, is made of dishwasher-proof materials, and is relatively compact in size.

In accordance with the present invention, the foregoing objects are met by the provision of a basting device in which a bellows replaces the usual rubber squeeze bulb to generate suction and ejection pressures to handle substantial quantities of basting liquid. The bellows is believed to be capable of creating substantially more suction than the usual squeeze-bulb of the same size.

A further aspect of the invention lies in the provision of a valve at the tapered narrow tip of the tube of the baster, with the valve providing resistance to the flow of liquid sufficient to eliminate or greatly reduce instances of unwanted dripping of liquid from the tube.

Preferably, the valve member is a flexible membrane with slits, and the membrane is easily accessible to ease the removal of clogging particles.

Preferably, the lower tip of the tube is angled to provide a re-directed outward stream of liquid to facilitate basting.

Also preferably, a flange is provided which extends outwardly from the outside wall of the tube adjacent the bellows to provide a gripping surface against which the bellows can be pushed to compress it.

The foregoing objects and advantages of the invention will be set forth in or apparent the following description and drawings.

IN THE DRAWINGS

GENERAL DESCRIPTION

Figure 1:
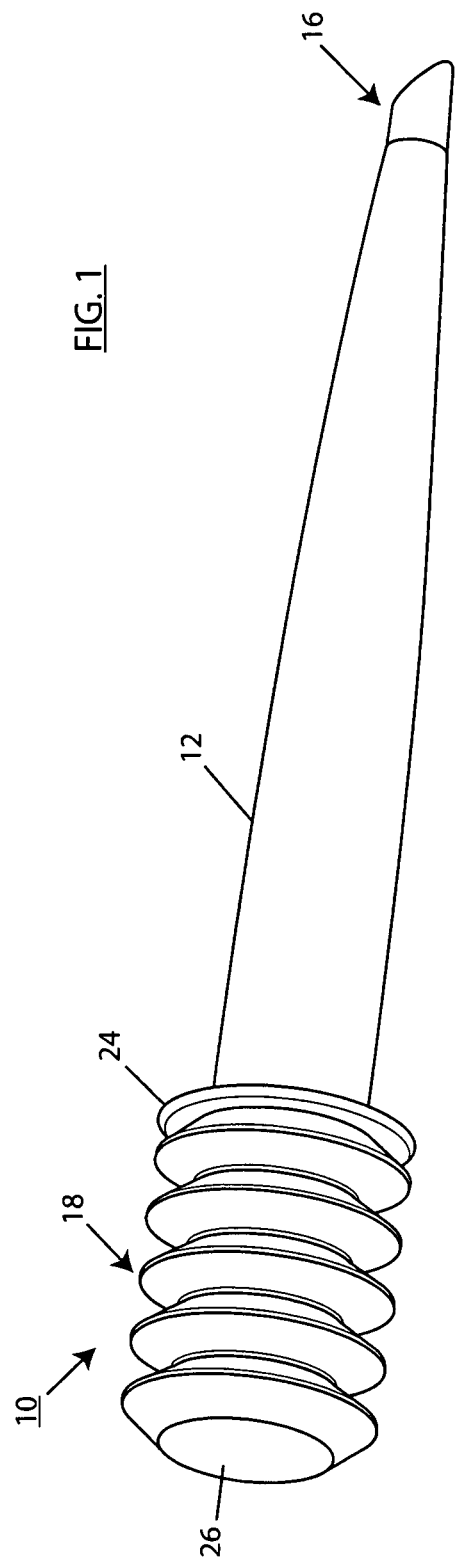
FIG. 1 is a perspective view of the preferred embodiment of the basting device of the present invention.
Figure 2:
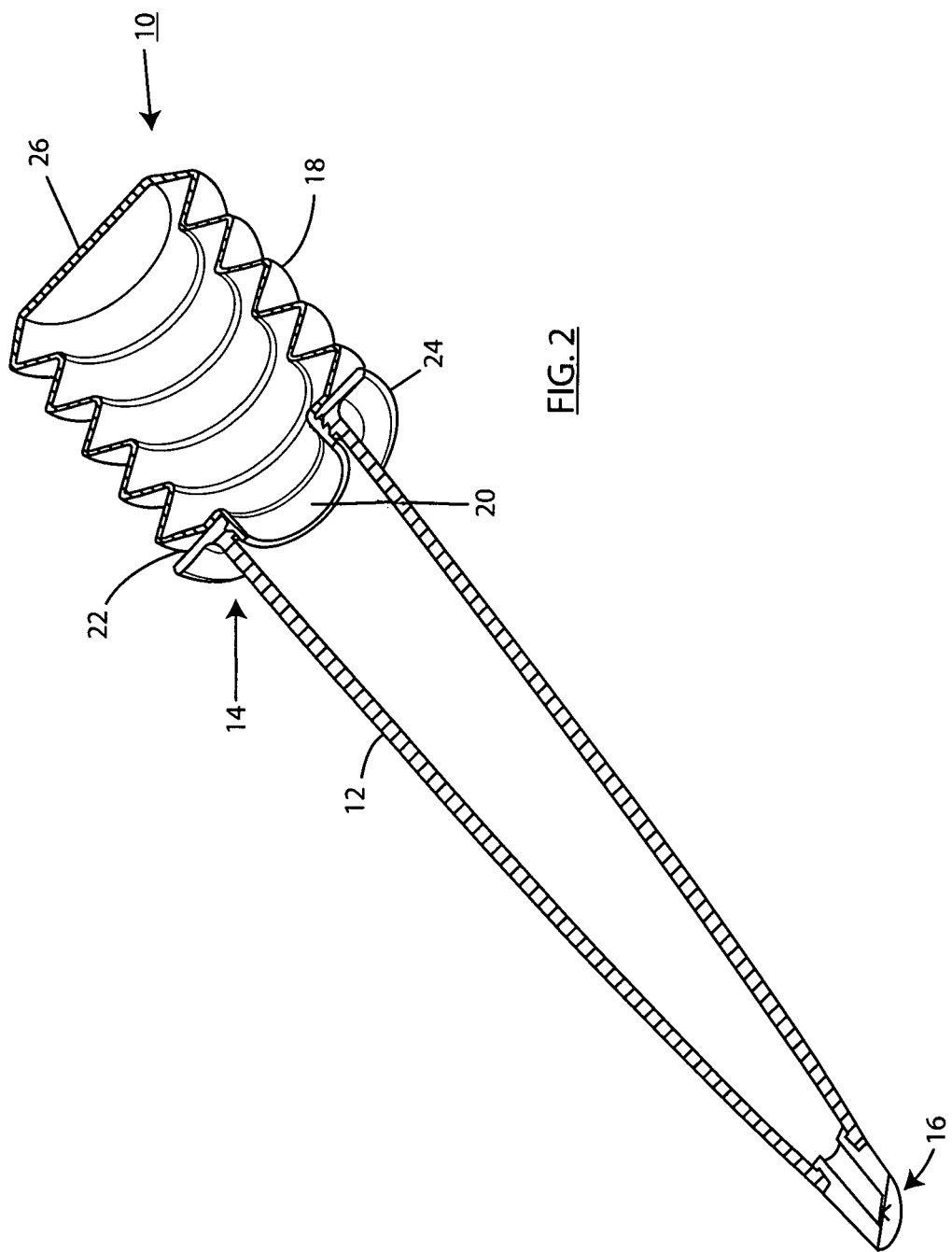
FIG. 2 is a perspective cross-sectional view of the device shown in FIG. 1.

The baster device 10 shown in FIGS. 1 and 2 of the drawings has an elongated tapered hollow tubular body portion 12, with a relatively large opening at the upper end 14 of the tube, and a relatively small opening at the narrow end 16 of the tube.

Connected to the tube 12 at its upper end 14 is a bellows 18 with a short tubular extension 20 (FIG. 2) with screw threads mating with screw threads 22 on the inside surface of the tube at its upper end 14. A flange 24 extends outwardly from the outside of the tube 12 at the upper end 14 to serve as a finger-gripping surface so that the user can apply pressure to compress the bellows by pushing on the rear surface 26 of the bellows with the thumb while gripping the flange 24 with other figures of the same hand.

Figure 3:
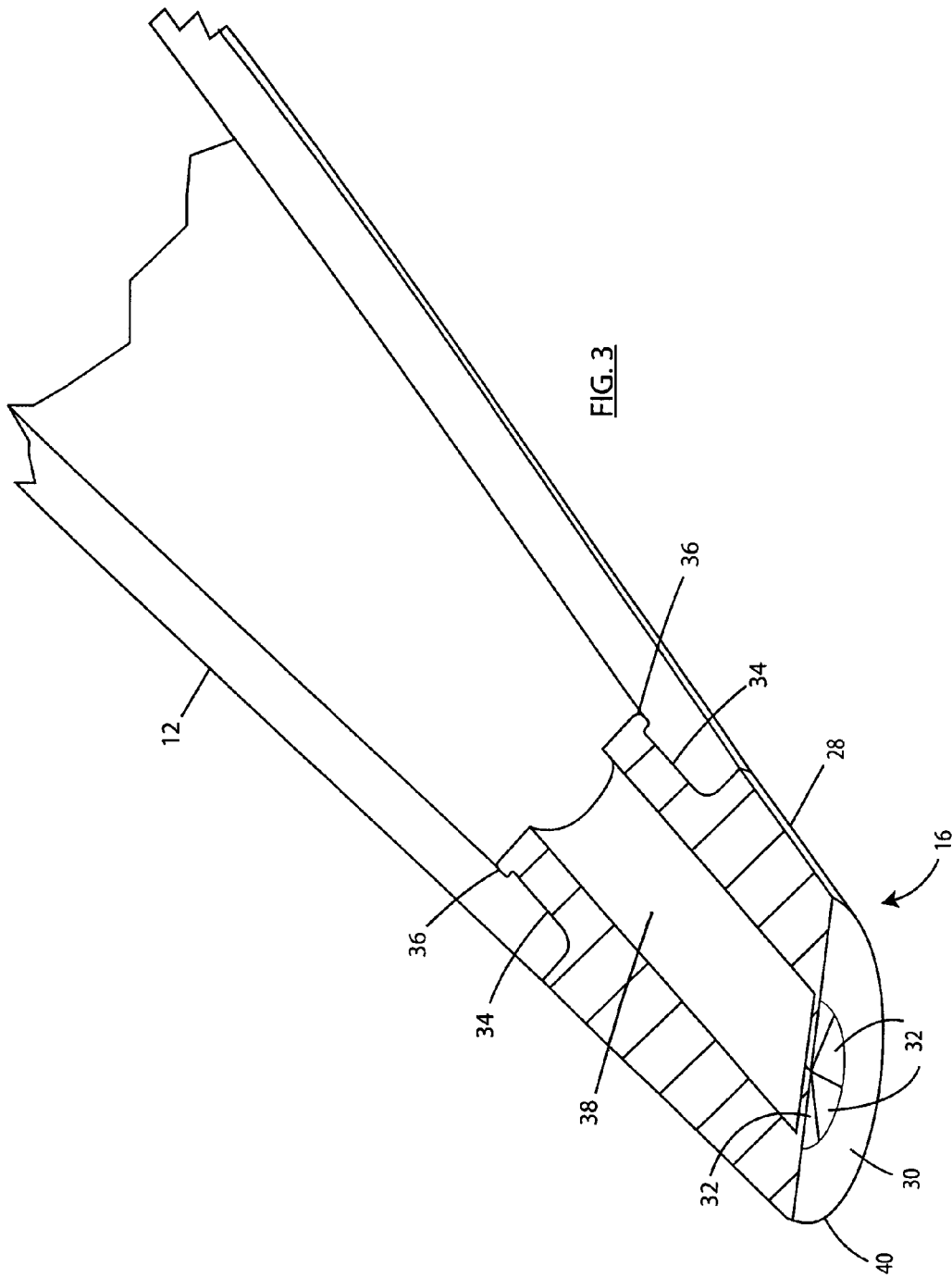
FIG. 3 is an enlarged cross-sectional view of the lower tip of the device shown in FIGS. 1 and 2.
Figure 4:
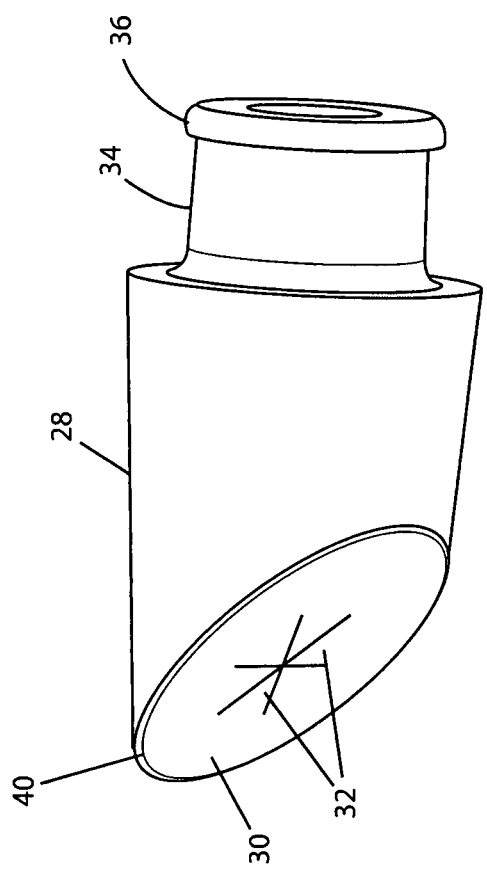
FIG. 4 is a perspective view of the insert forming the end of the tip of the device shown in FIG. 3.

Referring now to FIGS. 3 and 4, as well as FIG. 2, the valve structure at the lower tip 16 of the tube 12 is formed conveniently on an insert 28 which is fitted into the opening in the end of the tube 12. The insert 28, as shown in FIGS. 3 and 4, has a reduced external diameter at 34 and a flange at 36 which mates with a similarly shaped receiving structure at the end of the tube body 12 so that the insert 28 can be snapped into and pulled out of the end of the tube 12 relatively easily so as to facilitate cleaning the tip structure to keep it sanitary.

The insert 28 has an internal cylindrical passage 38 which is of a significantly smaller diameter than the end of the tube 12 so as to provide a certain amount of restriction to the flow of liquid.

Covering the end of the passage 38 is a flexible membrane 30 secured to the angled end portion 40 of the insert 28. The membrane has a plurality of crossed slits 32 to serve as restricted inlet-outlet openings.

The surface 40 at the lower end of the insert 28 forms an acute angle with the longitudinal axis of the tube 12 to better facilitate drawing up liquid from the bottom of the pan where the baster is held at an angle to the pan. Also, the ejected stream of basting liquid is directed at an acute angle to the axis to facilitate basting.

Preferably, the amount of pressure differential across the membrane 30 required to open the slits 32 to allow liquid to pass through is great enough to prevent most or all dripping of liquid from the tube 12, even when the tube is oriented vertically with a full column of liquid above the membrane 30.

Preferably, the diameter of the tube portion 38 of the insert is dimensioned and the membrane 30 is designed so that the amount of pressure differential across the membrane necessary to open the slits is a small fraction of the total amount of pressure that can be provided by operation of the bellows. Therefore, excessive force need not be applied to the bellows merely to open the valve.

The bellows preferably is molded of TPR (thermoplastic rubber), or silicone rubber and has multiple folds which collapse upon one another to reduce the volume of the bellows to a very low fraction of the starting volume of the bellows. This provides an enhanced volume of fluid movement in the basting device. The resiliency of the material provides good suction pressure when the bellows is released.

The bellows can be made with very thin walls, if desired, by inserting a compression spring inside it to enhance its suction production capabilities.

Preferably, the outside dimensions of the bellows 18 are of the same order of magnitude as that of the flange 24 so as to keep the profile of the baster device relatively slender.

The tube 12 preferably is molded of dishwasher-proof high temperature co-polyester resin such as "Tritan" resin sold by Eastman Chemical Co. of Tennessee.

Advantageously, the insert 28 and the membrane 30 are formed as an integral unit made of high-temperature silicone rubber. In other words, the insert 28 shown in FIG. 4 is formed in a single mold.

To wash out the inside of the bellows and the tube, one can remove the insert 28 from the lower tip and unscrew the bellows from the tube, and wash the separate elements.

In use, after a turkey or other large fowl, or a large roast, etc. has baked for a certain length of time, juices commonly form in the pan in which the food item rests while being baked. After the baking process has progressed to a certain degree, the food item can be removed from the oven. The lower tip 16 of the basting device is inserted into the liquid when the bellows 18 is compressed, and then the bellows is released. This will draw substantial amount of liquid from the pan into the tube. Then the baster can be carried from one pan to another pan, to baste another food item, if desired, or it can be used to baste the food item in the same pan. In either case, unwanted dripping is either eliminated or greatly minimized.

As it can be seen from the foregoing, the basting device and method of the present invention meet the objectives set forth above. The bellows device is capable of moving substantially increased volumes of liquid, even while maintaining a relatively slim profile. The valve structure minimizes or eliminates unwanted dripping and is easily accessible to remove clogging food particles. The baster device is easy to disassemble and clean and reassemble for sanitary use.

The above description of the invention is intended to be illustrative and not limiting. Various changes or modifications in the embodiments described may occur to those skilled in the art. These can be made without departing from the spirit or scope of the invention.

The invention claimed is:

1. A food baster comprising
   a. an elongated hollow tube, with first and second ends, a first inlet-outlet opening at said first one of said ends and a second inlet-outlet opening at said second of said ends of said tube;
   b. a resilient bellows having an inlet-outlet opening connected to said first inlet-outlet opening of said tube to alternatingly apply suction and compression at said first inlet-outlet opening of said tube, whereby said bellows can be operated to alternatingly eject fluid from said tube and draw fluid into said tube through said second inlet-outlet opening,
   c. said tube being tapered to narrow its diameter from said first end to said second end,
   d. a valve member at said second end to provide resistance to the flow of liquid out through said second inlet-outlet opening to retard the unwanted escape of liquid through said second inlet-outlet opening, and
   e. in which said valve member comprises a flexible membrane and a plurality of crossing slits, and said membrane being mounted to said tube in a position adjacent said second inlet-outlet opening with said slits providing restricted inlet-outlet openings, and
   f. a restrictor member secured to said tube at said second inlet-outlet opening and forming a restriction to the diameter of said second inlet-outlet opening, said membrane being attached to said restrictor.

2. A device as in claim 1 in which said restrictor member has an angled end surface to which said membrane is attached, said angled surface forming an acute angle with the longitudinal axis of said tube.

* * * * *